US012650724B2

(12) United States Patent
Sampatirao et al.

(10) Patent No.: US 12,650,724 B2
(45) Date of Patent: Jun. 9, 2026

(54) DYNAMIC POWER MANAGEMENT FOR DATA PLANE APPLICATIONS IN USER SPACE

(71) Applicant: QUALCOMM Incorporated, San Diego, CA (US)

(72) Inventors: Hari Prasad Sampatirao, Fremont, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 18/807,646

(22) Filed: Aug. 16, 2024

(65) Prior Publication Data

US 2026/0050319 A1     Feb. 19, 2026

(51) Int. Cl.
*G06F 1/32* (2019.01)
*G06F 1/3209* (2019.01)
*G06F 1/324* (2019.01)
*G06F 1/3203* (2019.01)

(52) U.S. Cl.
CPC ............ *G06F 1/324* (2013.01); *G06F 1/3209* (2013.01); *G06F 1/3203* (2013.01)

(58) Field of Classification Search
CPC .............................. G06F 1/324; G06F 1/3209
USPC ......................................................... 713/322
See application file for complete search history.

(56) References Cited

U.S. PATENT DOCUMENTS

| | | | | |
|---|---|---|---|---|
| 6,795,927 B1 * | 9/2004 | Altmejd | ................ | G06F 1/3203 713/320 |
| 8,738,860 B1 * | 5/2014 | Griffin | ................ | G06F 12/0897 711/122 |
| 10,929,179 B2 * | 2/2021 | Guo | ....................... | G06F 9/5038 |
| 12,498,952 B2 * | 12/2025 | Li | ........................ | G06F 9/45558 |
| 12,498,964 B2 * | 12/2025 | Fujimoto | .............. | G06F 1/3296 |
| 2003/0093702 A1 * | 5/2003 | Luo | ............. | G06F 1/32 713/320 |
| 2004/0163000 A1 * | 8/2004 | Kuhlmann | ............ | G06F 1/3203 713/300 |
| 2008/0082847 A1 * | 4/2008 | Lee | ........................ | G06F 1/3203 713/323 |
| 2008/0109665 A1 * | 5/2008 | Kuhlmann | ............ | G06F 1/3203 713/300 |
| 2009/0180483 A1 * | 7/2009 | Przybylski | .......... | H04L 12/4637 370/400 |
| 2009/0316588 A1 * | 12/2009 | Nakamura | ............ | H04L 12/437 370/249 |

(Continued)

FOREIGN PATENT DOCUMENTS

WO      WO-2016101099 A1 *  6/2016  ............. H04L 43/08

*Primary Examiner* — Volvick Derose
(74) *Attorney, Agent, or Firm* — Loza & Loza LLP

(57) ABSTRACT

Aspects of the disclosure are directed to dynamic power management. In accordance with one aspect, the disclosure includes determining a system state using real-time monitoring of a plurality of input/output (IO) rings; transitioning a subset of a plurality of processing engines to an offline state to decrease from a quantity of the plurality of processing engines in an active power state to a remaining quantity; determining if a software-based data plane is required in the plurality of processing engines that remain in the active power state; and transitioning a data path hardware mode and a plurality of packet data flows for the remaining quantity.

20 Claims, 13 Drawing Sheets

(56)                References Cited

U.S. PATENT DOCUMENTS

| | | | | |
|---|---|---|---|---|
| 2013/0070588 A1* | 3/2013 | Steele | H04L 47/60 | 370/230 |
| 2013/0322458 A1* | 12/2013 | Nagumo | H04L 49/15 | 370/401 |
| 2014/0091770 A1* | 4/2014 | Lee | B60L 58/12 | 320/135 |
| 2014/0115221 A1* | 4/2014 | Ganasan | G06F 13/368 | 710/307 |
| 2014/0143558 A1* | 5/2014 | Kuesel | G06F 1/26 | 713/300 |
| 2016/0170478 A1* | 6/2016 | Bhandaru | G06F 1/3234 | 713/320 |
| 2017/0085488 A1* | 3/2017 | Bhattacharya | H04L 41/0806 | |
| 2020/0050523 A1* | 2/2020 | Pawlowski | G06F 13/4022 | |
| 2020/0401520 A1* | 12/2020 | Tsirkin | G06F 9/5061 | |
| 2021/0041929 A1* | 2/2021 | Connor | G06F 1/3253 | |
| 2024/0004454 A1* | 1/2024 | Pawar | G06F 1/30 | |
| 2025/0013507 A1* | 1/2025 | MacNamara | G06F 1/26 | |

* cited by examiner

300

Yes

No

If desc_prod Idx >= desc_cons Idx

310

Num of packets =
prod Idx – cons
Idx;
320

Num of packets =
ring size + prod
Idx – cons Idx;
330

To Block 1290

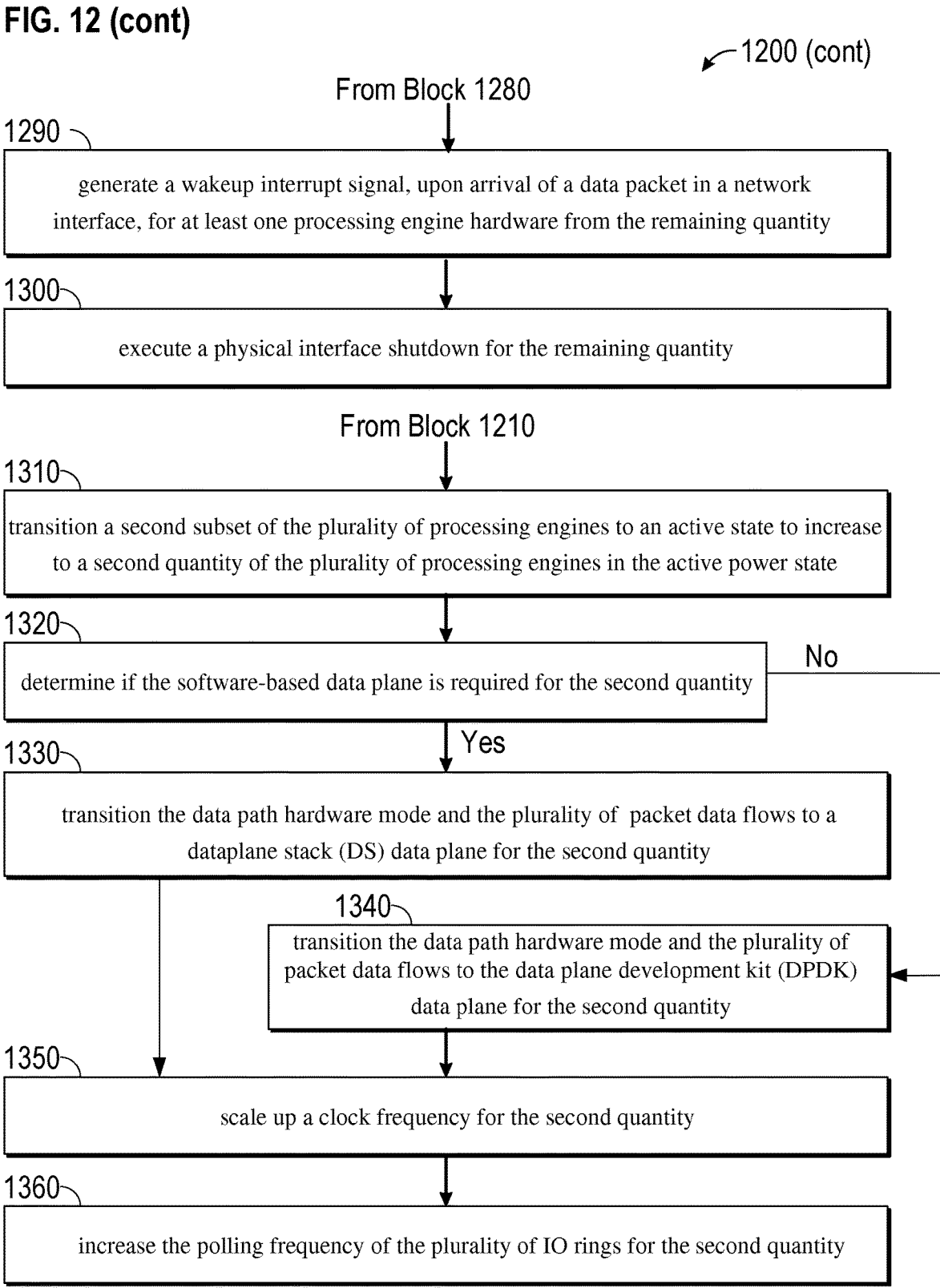

From Block 1280

1290 generate a wakeup interrupt signal, upon arrival of a data packet in a network interface, for at least one processing engine hardware from the remaining quantity

1300 execute a physical interface shutdown for the remaining quantity

From Block 1210

1310 transition a second subset of the plurality of processing engines to an active state to increase to a second quantity of the plurality of processing engines in the active power state

1320 determine if the software-based data plane is required for the second quantity          No Yes

1330 transition the data path hardware mode and the plurality of packet data flows to a dataplane stack (DS) data plane for the second quantity

1340 transition the data path hardware mode and the plurality of packet data flows to the data plane development kit (DPDK) data plane for the second quantity

1350 scale up a clock frequency for the second quantity

1360 increase the polling frequency of the plurality of IO rings for the second quantity

DYNAMIC POWER MANAGEMENT FOR DATA PLANE APPLICATIONS IN USER SPACE

TECHNICAL FIELD

The present disclosure relates generally to the field of information processing systems, and, in particular, to dynamic power management of a processing engine by data plane application.

BACKGROUND

Information processing systems include a plurality of processors and a plurality of storage devices. Data plane applications in user space executed on a processing engine may use polling to ingest data packets from a network interface. However, polling may result in an increased dc power consumption because of its high duty cycle. Thus, dynamic power management is desired for data plane applications which run in user space.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides dynamic power management. Accordingly, the present disclosure discloses a method including: determining a system state using real-time monitoring of a plurality of input/output (IO) rings; transitioning a subset of a plurality of processing engines to an offline state to decrease from a quantity of the plurality of processing engines in an active power state to a remaining quantity; determining if a software-based data plane is required in the plurality of processing engines that remain in the active power state; and transitioning a data path hardware mode and a plurality of packet data flows for the remaining quantity.

In one example, the real-time monitoring uses a ring depth defined by a producer index and a consumer index. In one example, the producer index provides a count of produced data packets. In one example, the consumer index provides a count of consumed data packets. In one example, the ring depth is a difference between the producer index and the consumer index. In one example, the system state includes one of the following: a power savings mode, a performance mode or a normal mode.

In one example, the method further includes scaling down a clock frequency for the remaining quantity. In one example, the method further includes decreasing a polling frequency of the plurality of IO rings for the remaining quantity. In one example, the method further includes introducing at least one sleep cycle in a sleep mode for the remaining quantity. In one example, the method further includes generating a wakeup interrupt signal, upon arrival of a data packet in a network interface, for at least one processing engine hardware from the remaining quantity. In one example, the method further includes executing a physical interface shutdown for the remaining quantity.

In one example, the data path hardware mode and the plurality of packet data flows are transitioned to a dataplane stack (DS) data plane for the remaining quantity. In one example, the data path hardware mode and the plurality of packet data flows are transitioned to a data plane development kit (DPDK) data plane for the remaining quantity.

Another aspect of the disclosure provides a method including: determining a system state using real-time monitoring of a plurality of input/output (IO) rings; transitioning a subset of a plurality of processing engines to an active state to increase to a quantity of the plurality of processing engines in the active power state; determining if a software-based data plane is required in the second quantity; and transitioning a data path hardware mode and a plurality of packet data flows for the quantity.

In one example, the method further includes determining if the software-based data plane is required for the quantity. In one example, the method further includes scaling up a clock frequency for the quantity. In one example, the method further includes increasing the polling frequency of the plurality of IO rings for the quantity.

Another aspect of the disclosure provides an apparatus including: a network interface card (NIC) configured to determine a system state using real-time monitoring of a plurality of input/output (IO) rings; a flow manager coupled to the NIC, the flow manager configured to transition a subset of a plurality of processing engines to an offline state to decrease from a quantity of the plurality of processing engines in an active power state to a remaining quantity; and a central processing unit (CPU) coupled to the NIC, the CPU configured to scale down a clock frequency for the remaining quantity of the plurality of processing engines.

In one example, the NIC is further configured to determine the system state using the real-time monitoring by using a ring depth defined by a difference between a producer index and a consumer index. In one example, the system state includes one of the following: a power savings mode, a performance mode or a normal mode.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An information processing system, for example, a computing system with multiple slices (e.g., processing engines) or a system on a chip (SoC), may require multiple levels of coordination or synchronization. In one example, a slice may include a processing engine (i.e., a subset of the computing system) as well as associated memory units and other peripheral devices. In one example, execution of an application may be decomposed into a plurality of work tasks which are executed by multiple slices or multiple processing engines.

Figure 1:
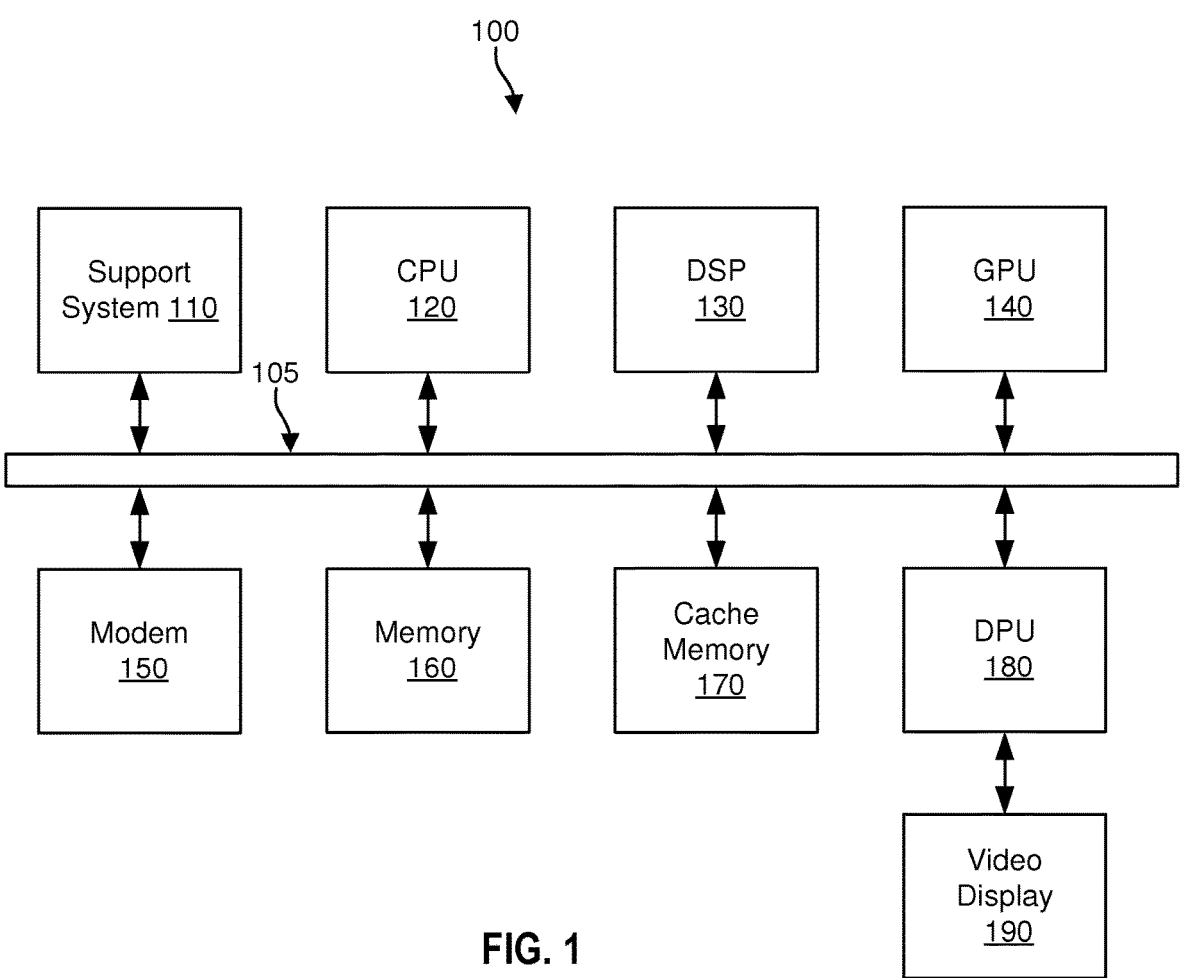
FIG. 1 illustrates an example information processing system.

FIG. 1 illustrates an example information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information.

For example, the memory 160 and/or the cache memory 170 may be shared among the CPU 120, the GPU 140s and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory (i.e., a dedicated memory) which is not shared with the other processing engines. Although several components of the information processing system 100 are included herein, one skilled in the art would understand that the components listed herein are examples and are not exclusive. Thus, other components may be included as part of the information processing system 100 within the spirit and scope of the present disclosure.

In one example, the information processing system 100 may be part of a wireless device in a wireless communication system. For example, the wireless communication system may conform to a wireless network protocol such as 4G LTE (long term evolution), 5G NR (new radio), etc.

In one example, the information processing system 100 may have a memory hierarchy with different levels of memory access times and storage capacity. In one example, a memory with larger storage capacity has a slower memory access time and a memory with smaller storage capacity has a faster memory access time. In one example, a bulk memory is a memory device with large storage capacity but slow memory access time which may be more suitable for bulk storage applications. In one example, a local memory is a memory device with small storage capacity but fast memory access time which may be more suitable for immediate processing applications.

In one example, the information processing system 100 may include a network interface card (NIC) to ingest data packets from a network and to send data packets to the network. In one example, the NIC complies with network protocols at different protocol layers. For example, protocol layers include a physical layer, a data link layer, an internetworking layer, a transport layer, etc. For example, the network protocols may be WiFi, Ethernet, Internet protocol (IP), transmission control protocol (TCP), user datagram protocol (UDP), etc. In one example, the NIC may interface with the modem 150 for physical layer processing. In one example, the NIC may include the modem 150 in its functionality.

In one example, network processing may execute in a plurality of network planes. For example, a network plane is a group of related functionalities for a network operation. In one example, the plurality of network planes may include a data plane, a control plane and a management plane. In one example, the data plane involves network functions for execution of data packet transport and routing. In one example, the control plane involves network functions for configuration and control of data packet transport and routing. In one example, the management plane involves network functions for overall supervision and policy management of data packet transport and routing.

In one example, the control plane is responsible for configuration and control of data packet forwarding and routing. In one example, the data plane is responsible for execution of data packet transport and routing from a source to a destination. In one example, the data plane is also known as a forwarding plane. In one example, the data plane may be implemented in different processing engine entities such as processing engine hardware, a software kernel (e.g., Linux kernel) or user space. In one example, user space is a portion of memory which is allocated to a user to execute an application. In one example, each data plane implementation has certain beneficial features and characteristics. In one example, a user space-implemented data plane may have similar performance benefits as a hardware-implemented data plane and also similar flexibility benefits as a software kernel-implemented data plane.

In one example, a data plane application executing in the user space in a processing engine may use a poll mode driver (PMD) to receive data packets from an external network via the NIC using polling. In one example, the NIC may implement a plurality of input/output (IO) rings which are mapped to user space and are polled continuously for performance reasons. In one example, polling results in a significant dc power utilization by the processing engine.

Figure 2:
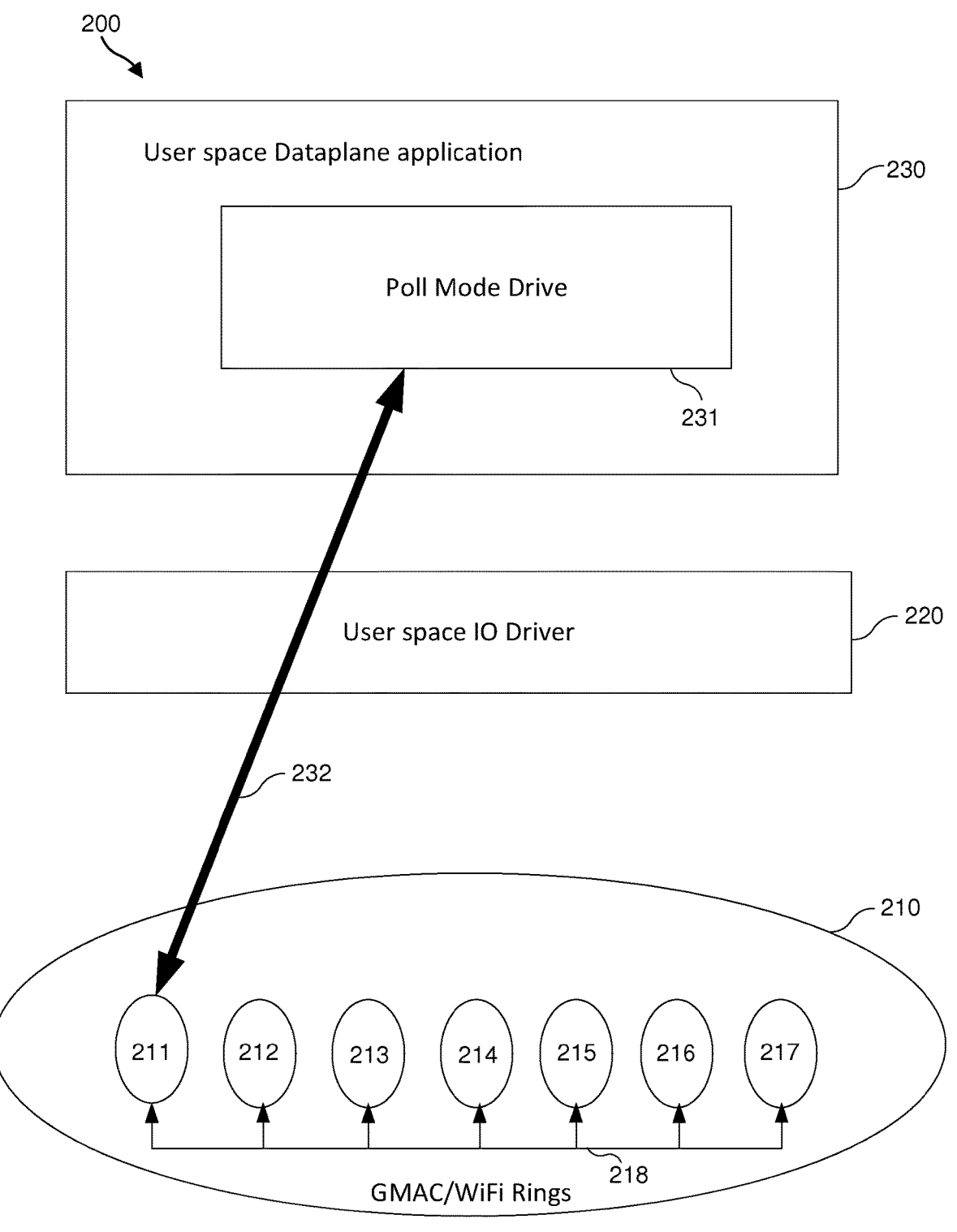
FIG. 2 illustrates an example mapping of user space to input/output (IO) rings.

FIG. 2 illustrates an example mapping 200 of user space to input/output (IO) rings. In one example, the mapping of user space to IO rings 200 includes a plurality of IO rings 210. In one example, the plurality of IO rings 210 may be a plurality of gigabit media access controller (GMAC) rings or a plurality of WiFi rings. In one example, the plurality of IO rings 210 includes a first IO ring 211, a second IO ring 212, a third IO ring 213, a fourth IO ring 214, a fifth IO ring 215, a sixth IO ring 216, a seventh IO ring 217 etc. Although seven IO rings are shown in FIG. 2, one skilled in the art would understand that other quantities of IO rings are within the scope and spirit of the present disclosure. In one example, the plurality of IO rings 210 are interconnected with a common IO databus 218.

In one example, the mapping 200 of user space to IO rings includes a user space IO driver module 220 as a physical layer interface to the plurality of IO rings 210. In one example, the mapping 200 of user space to IO rings includes a user space data plane application 230 with a poll mode driver (PMD) 231 which connects the user space data plane application 230 to one IO ring of the plurality of IO rings 210. In one example, the PMD 231 interrogates the plurality of IO rings 200 using a polling. In one example, the polling follows a schedule of interface signaling to determine if packet data for the user space data plane application 230 is available from an external network.

In one example, the user space data plane requires both high performance and minimal dc power consumption. For example, dc power management aims to achieve both requirements simultaneously.

In one example, an initial step is identification of a system state and subsequent steps involve power management techniques. In one example, identification of the system state includes detecting a power load on the processing engine and identifying subsequently an appropriate system mode. In one example, a system mode may be a power savings mode, a performance mode, etc. In one example, processing engine hardware may monitor IO rings mapped per processing engine for the power load and generate an interrupt signal. In one example, the interrupt signal indicates an interface power load which may be used by a power management application to select the appropriate system mode, e.g., power savings mode, performance mode, etc.

In one example, a plurality of IO rings are ring data structures where the processing engine hardware populates data packets for the processing engine to ingest and process. In one example, a receive element of the plurality of IO rings receive is mapped to a specific processing engine. In one example, the poll mode driver (PMD) polls the receive element of a plurality of IO rings for data packets for processing and sends processed data packets to a transmit element of the plurality of IO rings which are mapped to the processing engine.

In one example, each receive element of the plurality of IO rings includes two indices for data packet processing. In one example, a producer index (e.g., ProdIdx) provides a count of produced data packets. In one example, a consumer index (e.g., ConsIdx) provides a count of consumed data packets. In one example, processing engine hardware is a producer of data packets and the PMD 231 is a consumer of data packets. In one example, at a given point in time, a number of packets which needs to be processed by the processing engine may be determined from the producer index and the consumer index.

Figure 3:
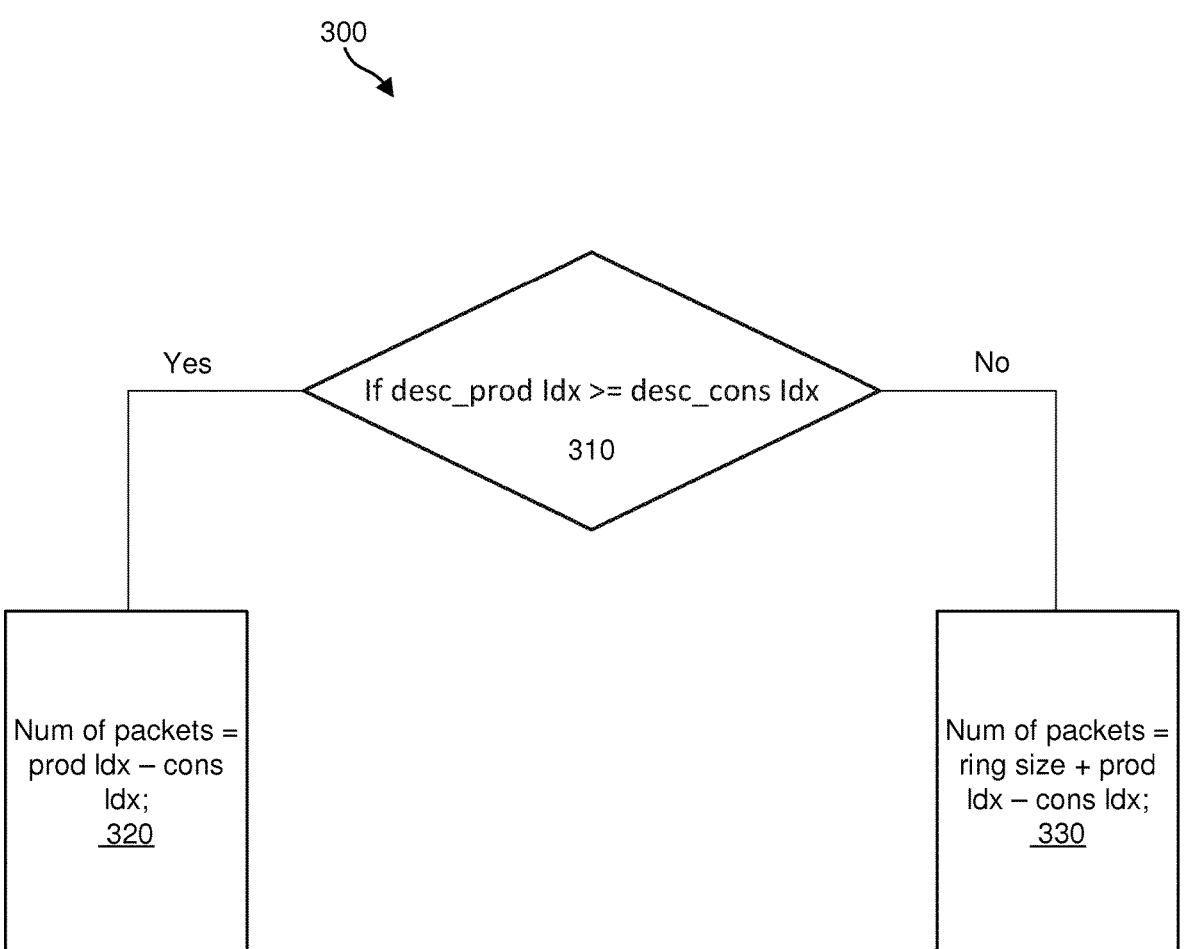
FIG. 3 illustrates an example logic flow for packet accounting.

FIG. 3 illustrates an example logic flow 300 for packet accounting. In one example, the logic flow 300 for packet accounting commences with a decision tree 310. In one example, the decision tree 310 compares the producer index to the consumer index. If the producer index is greater than or equal to the consumer index, then proceed to step 320. Otherwise, proceed to step 330. In one example, in step 320, a number of packets is equal to a difference of producer index and consumer index. In one example, in step 330, the number of packets is equal to a sum of IO ring size and the producer index minus the consumer index.

In one example, a minimum ring depth threshold is a threshold which may be used to indicate a minimum traffic load on the IO ring interface (i.e., a minimum packet count is needed for processing and a low dc power may be used to achieve this processing). In one example a monitoring interval is a configurable time period used to monitor IO ring depth. In one example, if the traffic load on the IO ring interface is less than the minimum ring depth threshold for the monitoring interval, then a power save mode interrupt signal is generated.

Figure 4:
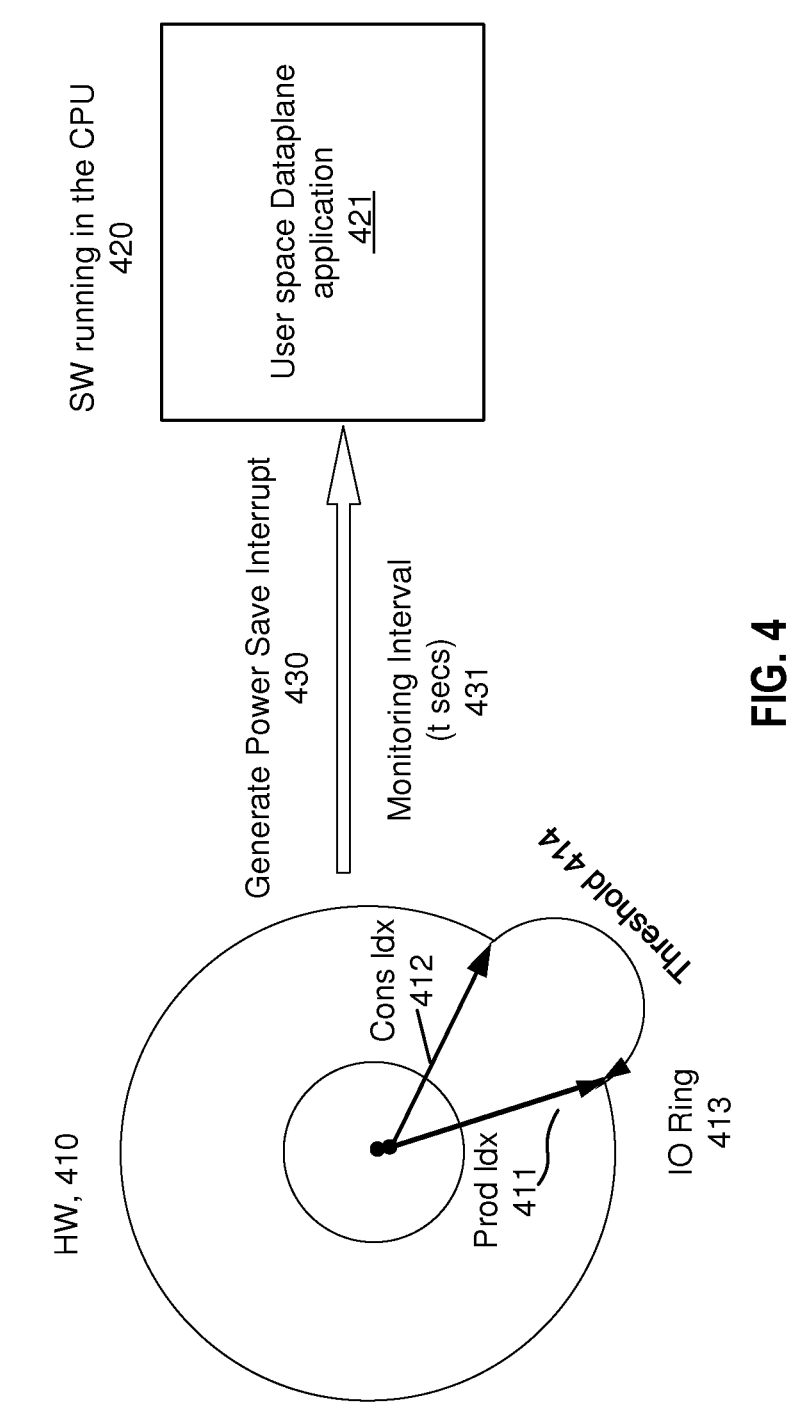
FIG. 4 illustrates an example power save interrupt scenario.

FIG. 4 illustrates an example power save interrupt scenario 400. In one example, a processing engine hardware module 410 communicates with a processing engine software module 420 via an interrupt signal interface 430. In one example, the processing engine hardware module 410 is in one of a plurality of system states. In one example, the processing engine hardware is in a performance mode system state. In one example, the processing engine software module 420 includes a user space data plane application 421. In one example, the processing engine hardware module 410 includes a producer index 411 and a consumer index 412 which provide real-time monitoring of an IO ring 413.

In one example, a ring depth is defined by a difference between the producer index 411 and the consumer index 412. In one example, if the ring depth is less than a minimum ring depth threshold 414 over a configurable monitoring interval 431, then the traffic load on the IO ring 413 is determined to be low. In one example, a power save mode interrupt signal is sent from the processing engine hardware module 410 to the processing engine software module 420 via the interrupt signal interface 430. In one example, the power save mode interrupt signal is used to transition to a power savings mode system state. In one example, otherwise, the processing engine hardware module 410 remains in the performance mode system state.

In one example, a maximum ring depth threshold is a threshold which may be used to indicate a maximum traffic load on the IO ring interface. (i.e., a maximum packet count is needed for processing and a high dc power may be used to achieve this processing). In one example a monitoring interval is a configurable time period used to monitor IO ring depth. In one example, if a traffic load on the IO ring interface is greater than the maximum ring depth threshold for the monitoring interval, then a performance mode interrupt signal is generated.

Figure 5:
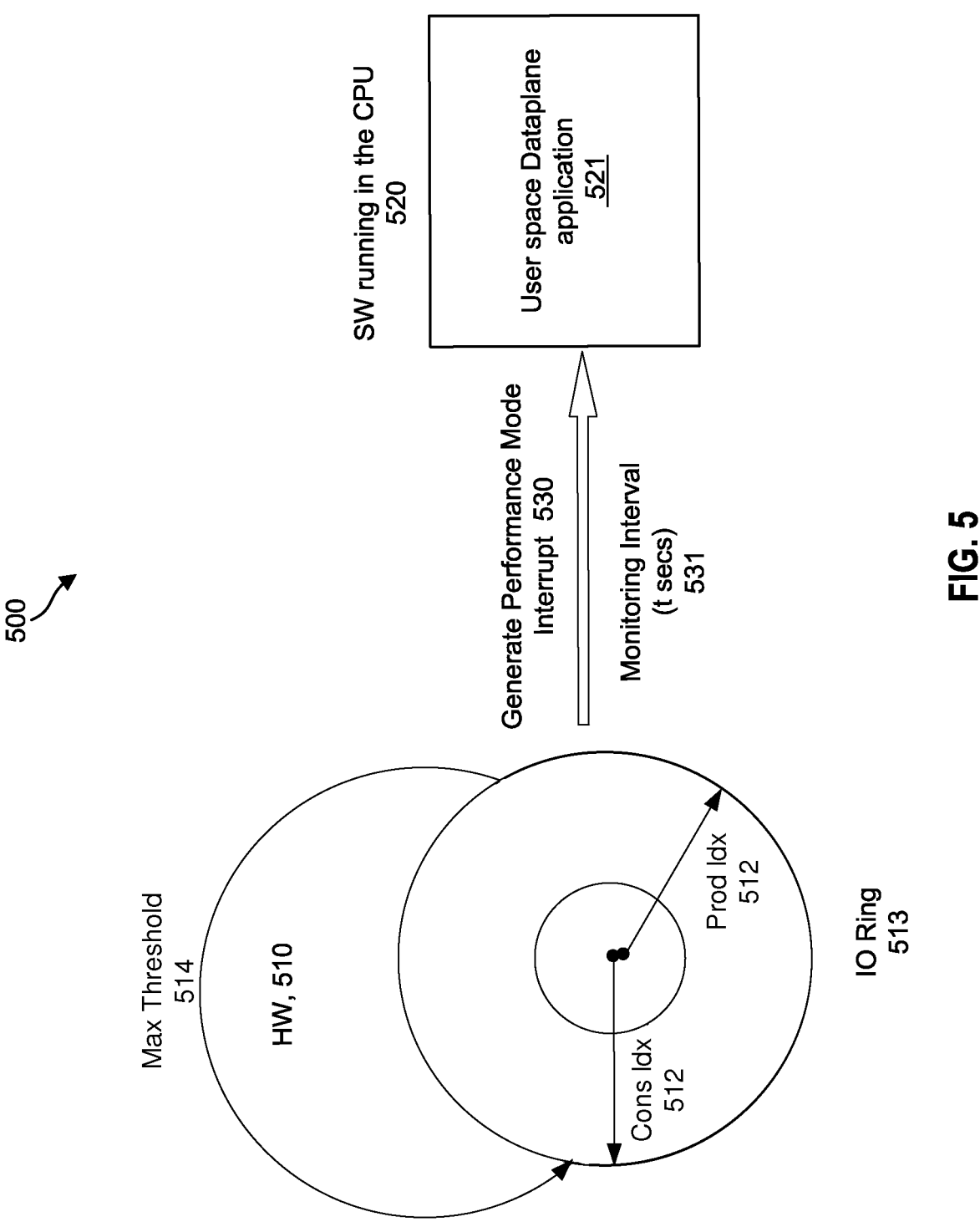
FIG. 5 illustrates an example performance mode interrupt scenario.

FIG. 5 illustrates an example performance mode interrupt scenario 500. In one example, a processing engine hardware module 510 communicates with a processing engine software module 520 via an interrupt signal interface 530. In one example, the processing engine hardware module 510 is in one of a plurality of system states. In one example, the processing engine hardware is in a power savings mode system state. In one example, the processing engine software module 520 includes a user space data plane application 521. In one example, the processing engine hardware module 510 includes a producer index 511 and a consumer index 512 which provide real-time monitoring of an IO ring 513.

In one example, a ring depth is defined by a difference between the producer index 511 and the consumer index 512. In one example, if the ring depth is greater than a maximum ring depth threshold 514 over a configurable monitoring interval 531, then the traffic load on the IO ring 513 is determined to be high. In one example, a performance mode interrupt signal is sent from the processing engine hardware module 510 to the processing engine software module 520 via the interrupt signal interface 530. In one example, the performance mode interrupt signal is used to transition to a performance mode system state. Otherwise, for example, the processing engine hardware module 510 remains in the power savings mode system state.

In one example, if a producer index and a consumer index are equal, then an IO ring is empty. In one example, if the IO ring is empty over a configurable monitoring interval, then there are no data packets arriving at the IO ring interface. In one example, a ring empty mode interrupt signal is generated.

Figure 6:
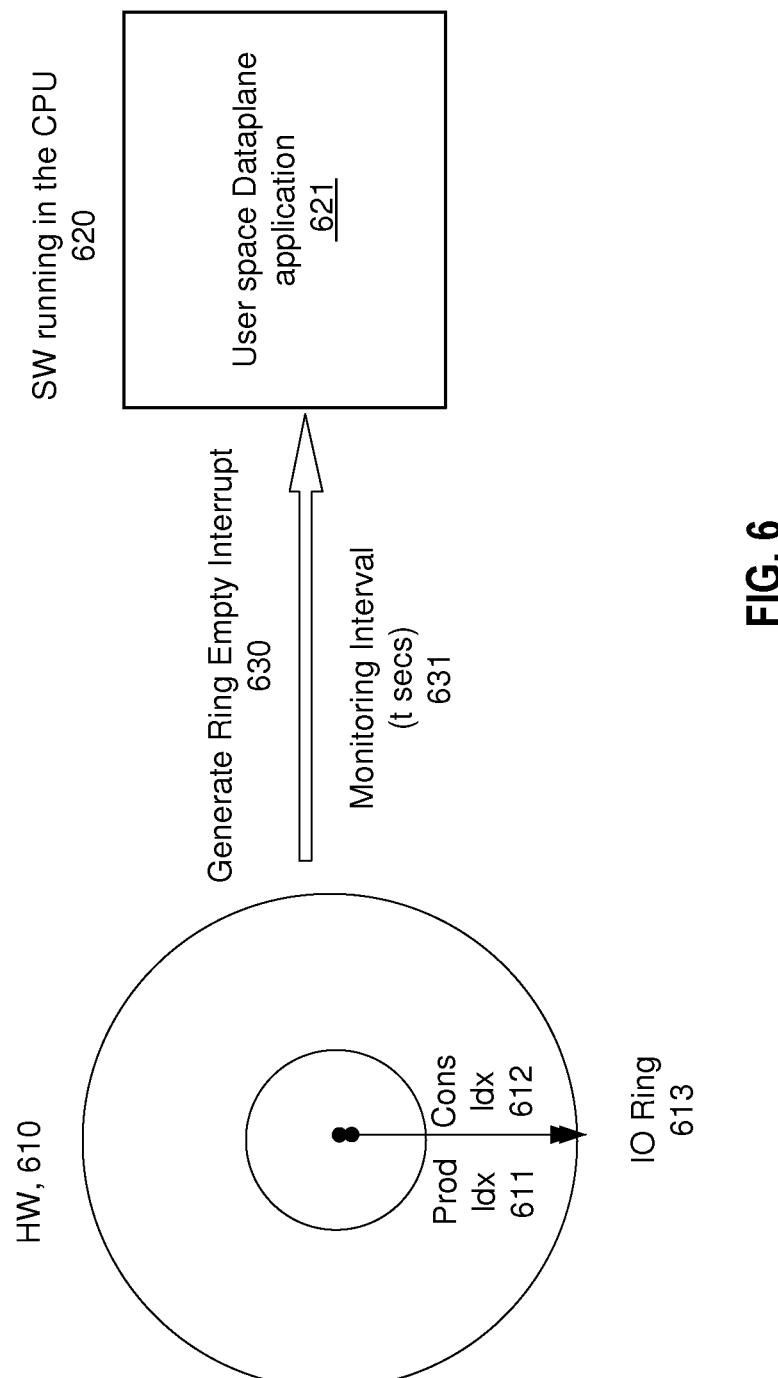
FIG. 6 illustrates an example ring empty mode interrupt scenario.

FIG. 6 illustrates an example ring empty mode interrupt scenario 600. In one example, a processing engine hardware module 610 communicates with a processing engine software module 620 via an interrupt signal interface 630. In one example, the processing engine hardware module 610 is in one of a plurality of system states. In one example, the processing engine hardware is in a performance mode system state. In one example, the processing engine software module 620 includes a user space data plane application 621. In one example, the processing engine hardware module 610 includes a producer index 611 and a consumer index 612 which provide real-time monitoring of an IO ring 613.

In one example, a ring depth is defined by a difference between the producer index 611 and the consumer index 612. In one example, if the ring depth is zero over a configurable monitoring interval 631, then the traffic load on the IO ring 613 is determined to be null. In one example, a ring empty mode interrupt signal is sent from the processing engine hardware module 610 to the processing engine software module 620 via the interrupt signal interface 630. In one example, the ring empty mode interrupt signal is used to transition to a ring empty mode system state. Otherwise, in one example, the processing engine hardware module 610 remains in the performance mode system state.

In one example, a plurality of dynamic power management techniques may be implemented for data plane applications which run in user space. In one example, dynamic power management techniques include:

1. Scaling of a quantity of processing engines (e.g., cores) to match system traffic load.
2. Selection of a matching data path based on dc power efficiency vs. performance.

3. Scaling a polling frequency of a receive IO ring to match system traffic load.
4. Introducing sleep cycles in a poll mode driver (PMD).
5. Implementing a poll mode driver (PMD) sleep cycle until receipt of a hardware interrupt signal.
6. Implementing a shutdown of physical interfaces.
7. Scaling of a processing engine clock frequency using available software kernel (e.g., Linux) scaling governors.

In one example, a first dynamic power management technique is processing engine scaling to match system traffic load. In one example, at a maximum performance level; that is, for the performance mode, a data plane application may be executed with a maximum quantity of processing engines. In one example, at a minimum performance level, that is, for the power savings mode, the data plane application may be executed with a single processing engine.

In one example, a receive data packet steering feature in a processing engine may distribute to a particular receive IO ring based on packet flow rules. In one example, the packet flow rules may be based on a metadata tuple. In one example, the metadata tuple may include network layer source address, network layer destination address, network protocol identifier, transport layer source port, transport layer destination port. In one example, the network layer source address may be a source IP address and the network layer destination address may be a destination IP address. In one example, the transport layer source port may be a source transmission control protocol (TCP) port and the transport layer destination port may be a destination TCP port.

In one example, if a power save mode interrupt signal is received, a specific set of processing engines may be transitioned to an offline power state based on the received power save mode interrupt signal. In one example, packet flows which were being handled by the specific set of processing engines may be redirected to be handled by other processing engines which remain in an active power state. In one example, the redirection may be performed by a receive packet steering (RPS) feature of the processing engine hardware module.

Figure 7:
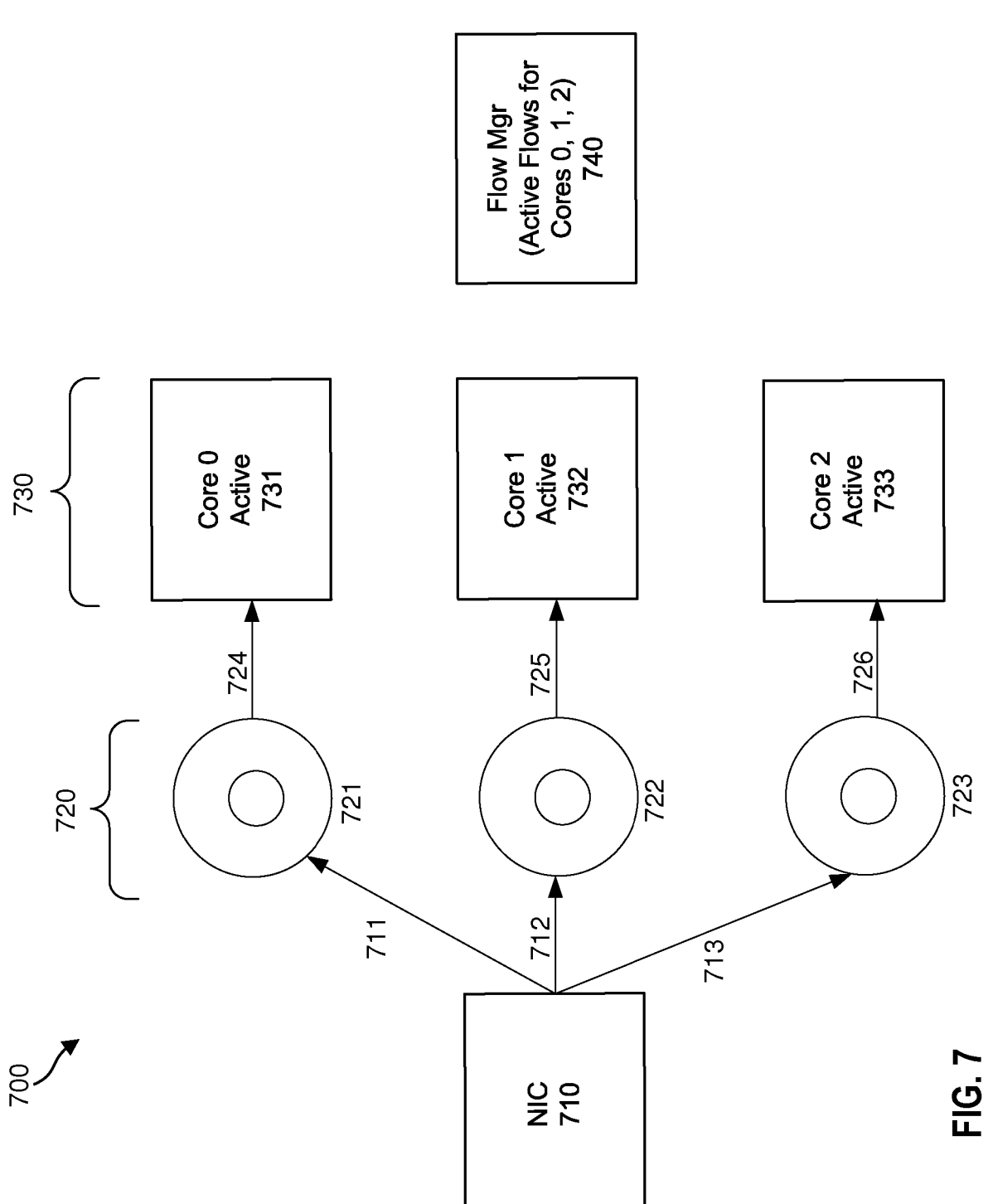
FIG. 7 illustrates a first example processing engine scaling scenario.

FIG. 7 illustrates a first example processing engine scaling scenario 700. In one example, a NIC 710 connects with a plurality of IO rings 720. In one example, the plurality of IO rings 720 includes a first IO ring 721, a second IO ring 722 and a third IO ring 723. One skilled in the art would understand that although only 3 IO rings are illustrated, the quantity of IO rings is not limited to 3 and other quantities are also within the scope and spirit of the present disclosure.

In one example, the NIC 710 connects to the first IO ring 721 via a first IO ring interface 711, to the second IO ring 722 via a second IO ring interface 712 and to the third IO ring 723 via a third IO ring interface 713. In one example, the plurality of IO rings 720 connects to a plurality of processing engines 730. In one example, the plurality of processing engines 730 includes a first processing engine 731, a second processing engine 732 and a third processing engine 733. One skilled in the art would understand that although only 3 processing engines are illustrated, the quantity of processing engines is not limited to 3 and other quantities are also within the scope and spirit of the present disclosure. In one example, the quantity of IO rings equal the quantity of processing engines.

In one example, the first IO ring 721 connects to the first processing engine 731 via a first processor interface 724, the second IO ring 722 connects to the second processing engine

732 via a second processor interface 725 and the third IO ring 723 connects to the third processing engine 733 via a third processor interface 726.

In one example, a flow manager 740 activates and manages receive packet steering (RPS) for the plurality of processing engines 730. In one example, for the first example processing engine scaling scenario 700, the first processing engine 731, the second processing engine 732 and the third processing engine 733 are in an active power state, and the receive packet steering (RPS) is programmed to distribute data packets to the active processing engines based on a metadata tuple.

Figure 8:
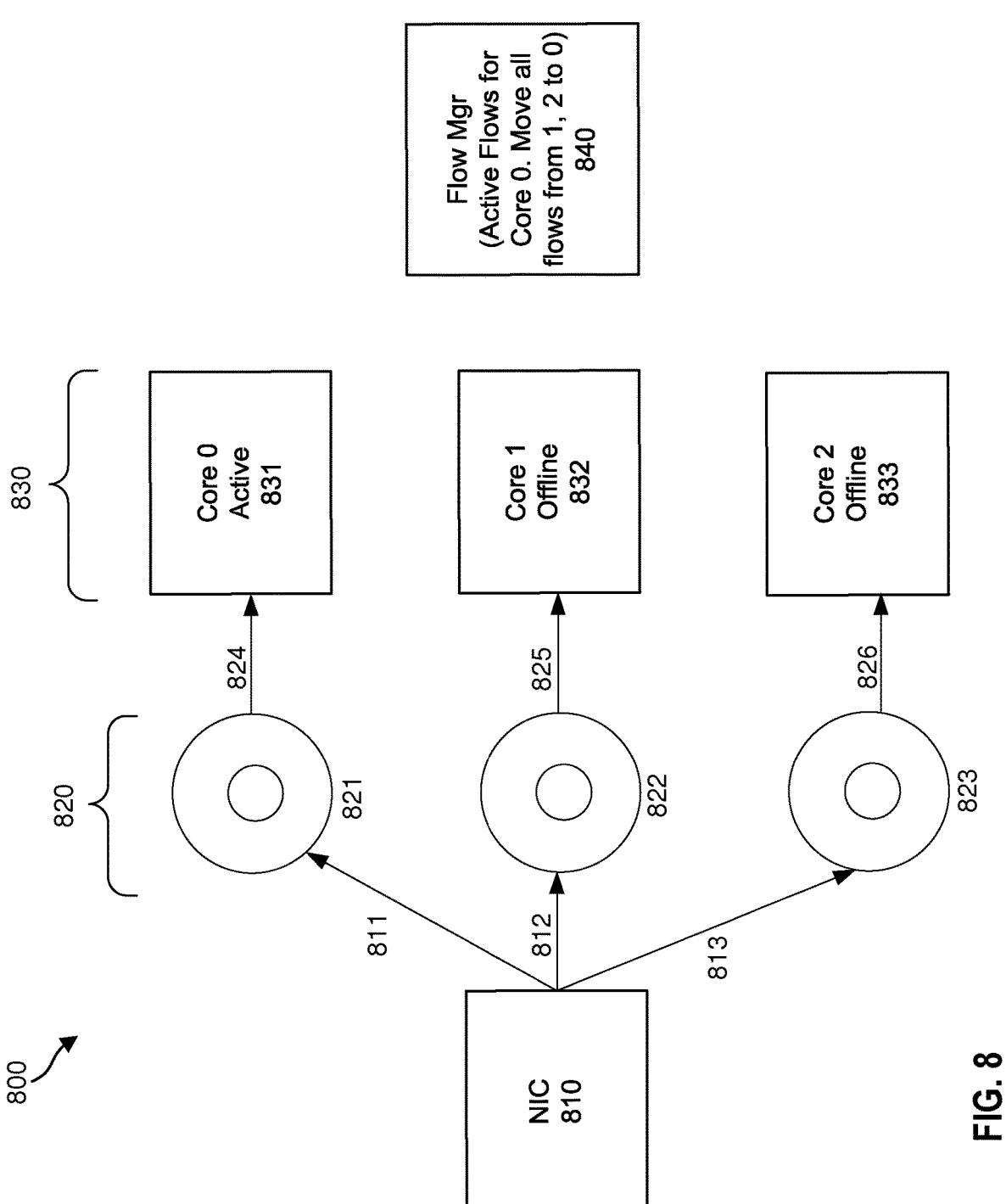
FIG. 8 illustrates a second example processing engine scaling scenario.

FIG. 8 illustrates a second example processing engine scaling scenario 800. In one example, a NIC 810 connects with a plurality of IO rings 820. In one example, the plurality of IO rings 820 includes a first IO ring 821, a second IO ring 822 and a third IO ring 823. In one example, the NIC 810 connects to the first IO ring 821 via a first IO ring interface 811, to the second IO ring 822 via a second IO ring interface 812 and to the third IO ring 823 via a third IO ring interface 813. One skilled in the art would understand that although only 3 IO rings are illustrated, the quantity of IO rings is not limited to 3 and other quantities are also within the scope and spirit of the present disclosure.

In one example, the plurality of IO rings 820 connects to a plurality of processing engines 830. In one example, the plurality of processing engines 830 includes a first processing engine 831, a second processing engine 832 and a third processing engine 833. One skilled in the art would understand that although only 3 processing engines are illustrated, the quantity of processing engines is not limited to 3 and other quantities are also within the scope and spirit of the present disclosure. In one example, the quantity of IO rings equal the quantity of processing engines.

In one example, the first IO ring 821 connects to the first processing engine 831 via a first processor interface 824, the second IO ring 822 connects to the second processing engine 832 via a second processor interface 825 and the third IO ring 823 connects to the third processing engine 833 via a third processor interface 826.

In one example, a flow manager 840 activates and manages receive packet steering (RPS) for the plurality of processing engines 830. In one example, for the second example processing engine scaling scenario 800, a power save interrupt signal is generated, and the second processing engine 832 and the third processing engine 833 are transitioned to an offline power state. In one example, the first processing engine 831 remains in an active power state and handles remaining data packet traffic. In one example, receive packet steering (RPS) is programmed to transition packet data flows from the second processing engine 832 and the third processing engine 833 to the first processing engine 831. In one example, RPS distributes subsequent data packets only to the active processing engine, that is, to the first processing engine 831 based on a metadata tuple.

In one example, a second dynamic power management technique is data path matching based on power efficiency versus performance. In one example, a hardware-based data plane such as dataplane stack (DS) may be limited by a quantity of data flows it can handle and may have limited functionality relative to a software-based data plane. In one example, the hardware-based data plane may have improved performance and dc power efficiency relative to a software-based data plane.

In one example, a user space-based data plane such as a data plane development kit (DPDK) may have improved performance relative to a software-based data plane (e.g., Linux-based data plane) wherein the user space-based data plane may handle packet data traffic with a one processing engine with other processing engines transitioned to an offline power state.

Figure 9:
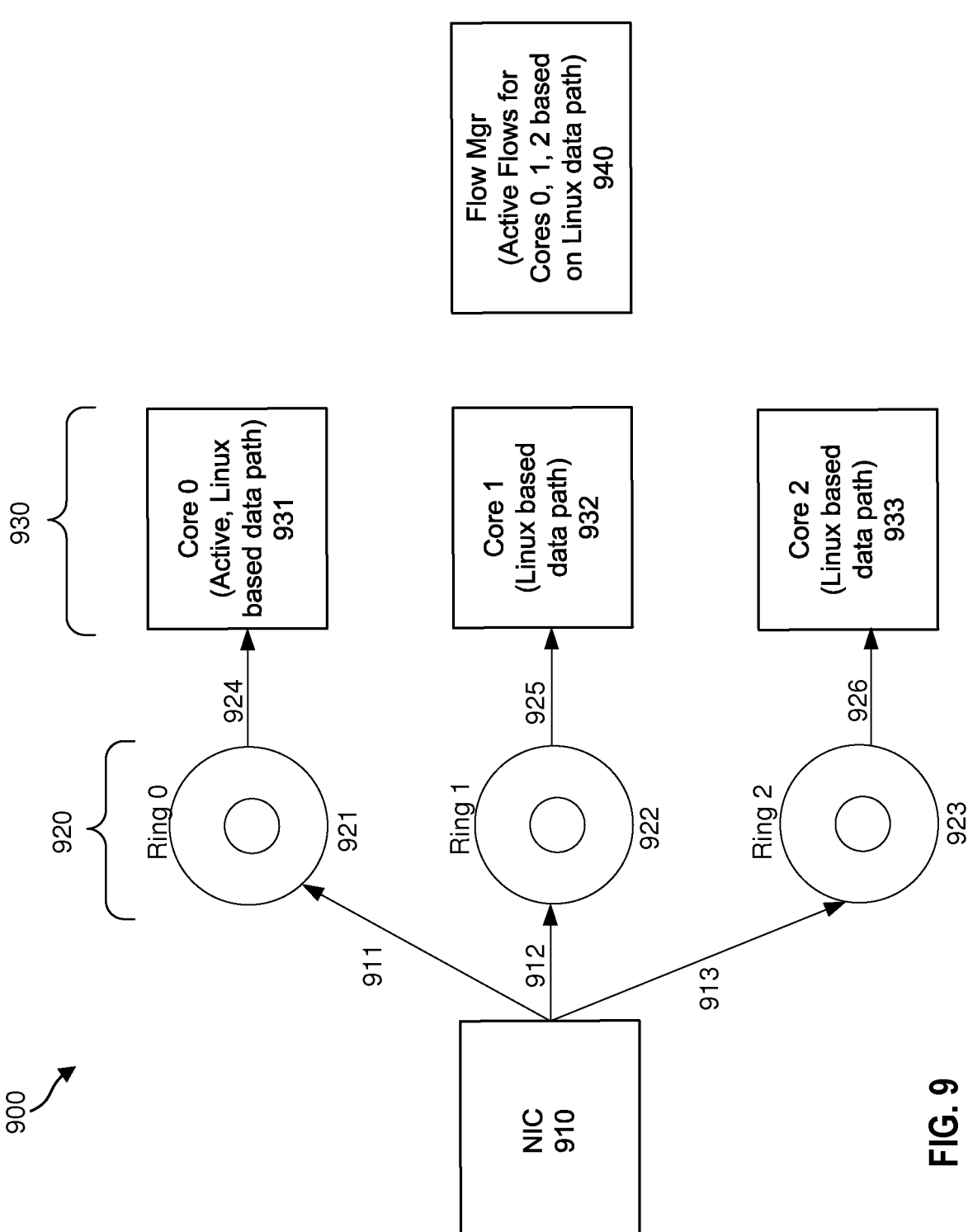
FIG. 9 illustrates a first example data path matching scenario.

FIG. 9 illustrates a first example data path matching scenario 900. In one example, a NIC 910 connects with a plurality of IO rings 920. In one example, the plurality of IO rings 920 includes a first IO ring 921, a second IO ring 922 and a third IO ring 923. One skilled in the art would understand that although only 3 IO rings are illustrated, the quantity of IO rings is not limited to 3 and other quantities are also within the scope and spirit of the present disclosure. In one example, the NIC 910 connects to the first IO ring 921 via a first IO ring interface 911, to the second IO ring 922 via a second IO ring interface 912 and to the third IO ring 923 via a third IO ring interface 913.

In one example, the plurality of IO rings 920 connects to a plurality of processing engines 930. In one example, the plurality of processing engines 930 includes a first processing engine 931, a second processing engine 932 and a third processing engine 933. One skilled in the art would understand that although only 3 processing engines are illustrated, the quantity of processing engines is not limited to 3 and other quantities are also within the scope and spirit of the present disclosure. In one example, the quantity of IO rings equal the quantity of processing engines.

In one example, the first IO ring 921 connects to the first processing engine 931 via a first processor interface 924, the second IO ring 922 connects to the second processing engine 932 via a second processor interface 925 and the third IO ring 923 connects to the third processing engine 933 via a third processor interface 926.

In one example, a flow manager 940 activates and manages receive packet steering (RPS) for the plurality of processing engines 930. In one example, for the first data path matching scenario 900, the first processing engine 931, the second processing engine 932 and the third processing engine 933 are in an active power state, and the RPS is programmed to distribute data packets to the active processing engines based on a metadata tuple. In one example, the data path is based out of a software kernel (e.g., Linux kernel).

Figure 10:
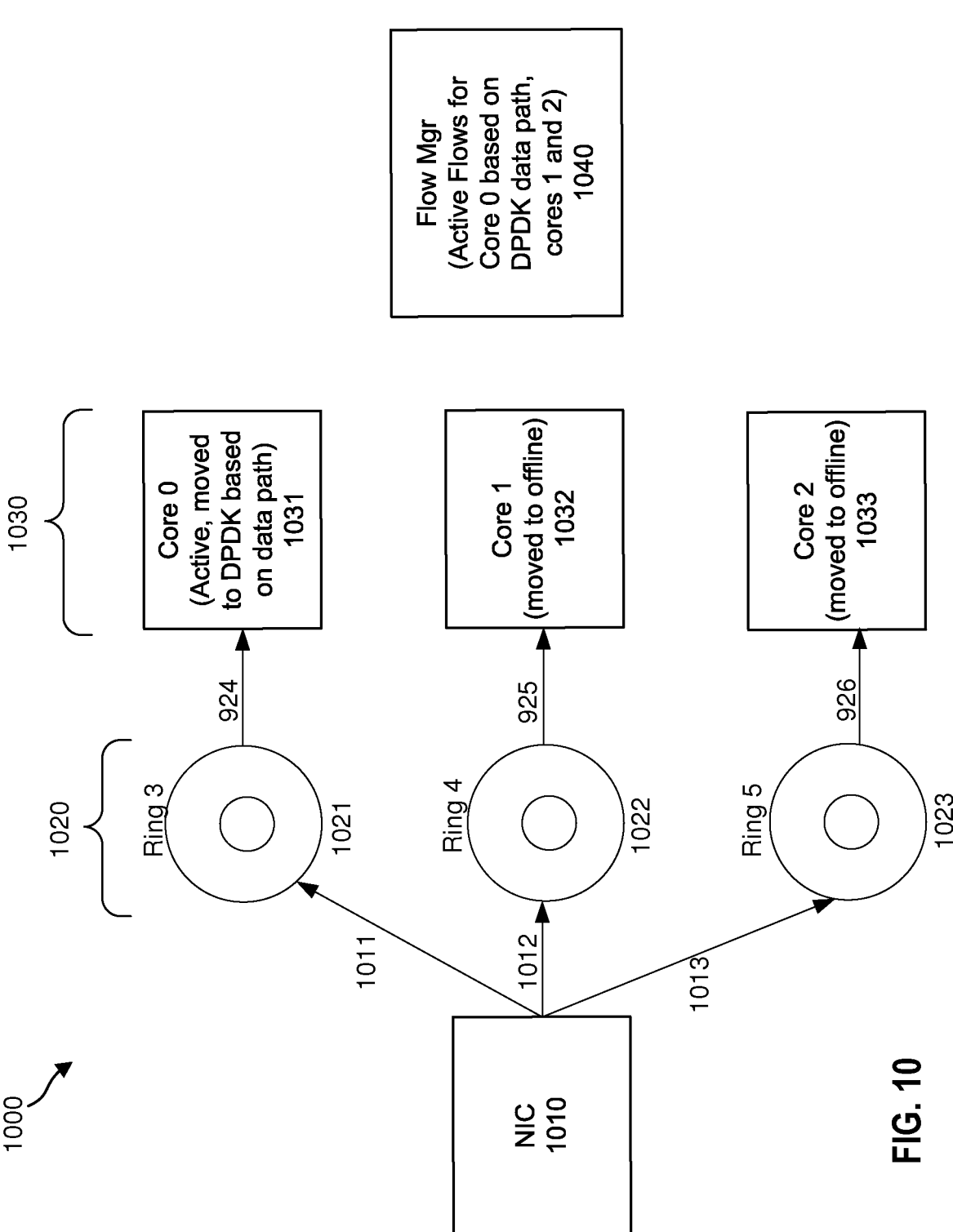
FIG. 10 illustrates a second example data path matching scenario.

FIG. 10 illustrates a second example data path matching scenario 1000. In one example, a NIC 1010 connects with a plurality of IO rings 1020. In one example, the plurality of IO rings 1020 includes a first IO ring 1021, a second IO ring 1022 and a third IO ring 1023. In one example, the NIC 1010 connects to the first IO ring 1021 via a first IO ring interface 1011, to the second IO ring 1022 via a second IO ring interface 1012 and to the third IO ring 1023 via a third IO ring interface 1013. One skilled in the art would understand that although only 3 IO rings are illustrated, the quantity of IO rings is not limited to 3 and other quantities are also within the scope and spirit of the present disclosure.

In one example, the plurality of IO rings 1020 connects to a plurality of processing engines 1030. In one example, the plurality of processing engines 1030 includes a first processing engine 1031, a second processing engine 1032 and a third processing engine 1033. In one example, the first IO ring 1021 connects to the first processing engine 1031 via a first processor interface 1024, the second IO ring 1022 connects to the second processing engine 1032 via a second processor interface 1025 and the third IO ring 1023 connects to the third processing engine 1033 via a third processor interface 1026. One skilled in the art would understand that although only 3 processing engines are illustrated, the quantity of processing engines is not limited to 3 and other quantities are also within the scope and spirit of the present disclosure. In one example, the quantity of IO rings equal the quantity of processing engines.

In one example, a flow manager 1040 activates and manages receive packet steering (RPS) for the plurality of processing engines 1030. In one example, for the second example data path matching scenario 1000, a power save interrupt signal is generated, and the second processing engine 1032 and the third processing engine 1033 are transitioned to an offline power state. In one example, the first processing engine 1031 remains in an active power state and handles remaining data packet traffic. In one example, the RPS is programmed to transition packet data flows from the second processing engine 1032 and the third processing engine 1033 to the first processing engine 1031. In one example, the RPS distributes subsequent data packets only to the active processing engine, that is, to the first processing engine 1031 based on a metadata tuple. In one example, the data path is based on a data plane development kit (DPDK) data path.

In one example, a third dynamic power management technique is polling frequency scaling. In one example, the polling frequency of the poll mode driver (PMD) may be scaled up or scaled down. In one example, when an interrupt signal is generated by processing engine hardware in response to a system load, a higher polling frequency is needed for a higher system load and a lower polling frequency is needed for a lower system load.

In one example, a fourth dynamic power management technique is a sleep cycle introduction. In one example, when a power save interrupt signal is generated by processing engine hardware in response to a system load, the poll mode driver (PMD) may use a hardware-based sleep instruction to configure a sleep mode with an introduction of sleep cycles for a configurable sleep period. In one example, the sleep mode results in a reduced dc power consumption, whereas, the performance mode results in higher dc power consumption with sleep cycles removed.

In one example, a fifth dynamic power management technique is an interrupt event wakeup. In one example, a DPDK data path may be launched only where there are data packets arriving on the network interface and a subsequent processing engine may run only a power savings application which has a low dc power demand. In one example, if the processing engine hardware detects an empty IO ring for all processing engines, the processing engine hardware may generate a ring empty interrupt signal and the power savings application may terminate the DPDK data path and any DPDK-based fast path application. In one example, when a data packet arrives in the network interface, the processing engine hardware may generate a wakeup interrupt signal and the power savings application may relaunch the DPDK data path and DPDK-based fast path application.

In one example, a sixth dynamic power management technique is a physical interface shutdown. In one example, when the processing engine hardware detects a ring empty state for all processing engines, it may generate a ring empty interrupt signal and a power savings application may shutdown physical interfaces (e.g., ports) and save dc power. In one example, when a data packet arrives in the network interface, the processing engine hardware may generate a wakeup interrupt signal and the processing engine hardware may enable the physical interfaces.

In one example, a seventh dynamic power management technique is a processing engine clock frequency scaling. In one example, scaling the processing engine clock frequency up or down affects dc power consumption and performance.

In one example, when a power save interrupt signal is generated by processing engine hardware in response to a system load, it may adjust system parameters in response to advanced configuration and power interface (ACPI) events or be manually changed by user space applications.

In one example, a software kernel (e.g., Linux kernel) may provide processing engine clock frequency scaling via a CPUFreq subsystem with two layers of abstraction: (1) a scaling governor implements algorithms to compute a desired clock frequency, potentially based on system load demand, (2) a scaling driver interacts with a processing engine directly, enabling the desired clock frequency requested by the scaling governor. In one example, a default scaling driver and default scaling governor may be selected automatically. In one example, user space tools (e.g., cpupower, acpid, laptop mode tools, desktop GUI tools, etc.) may be used for an advanced configuration setting.

Figure 11:
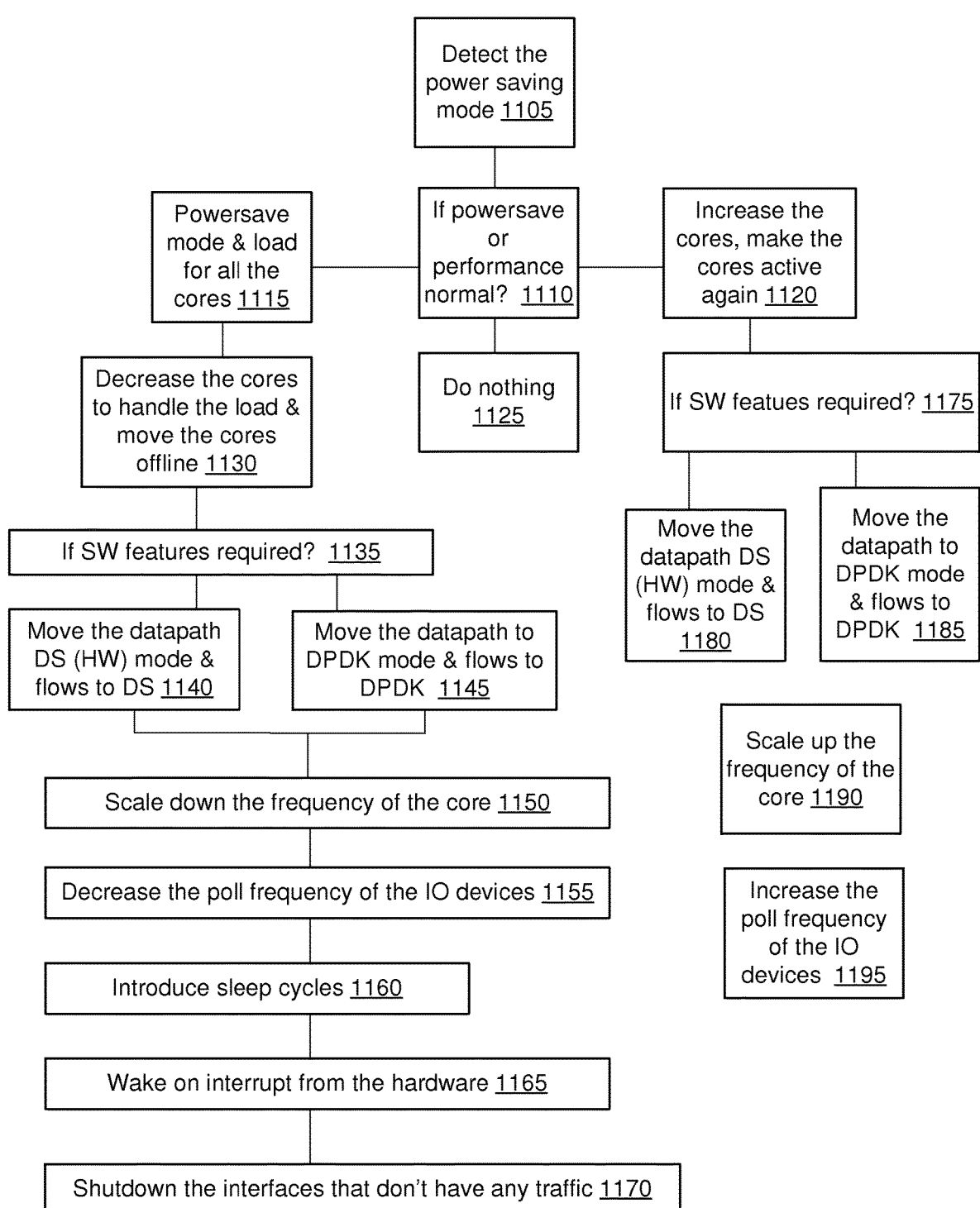
FIG. 11 illustrates an example logical flow sequence for dynamic power management.

FIG. 11 illustrates an example logical flow sequence 1100 for dynamic power management. In block 1105, commence a system state transition determination sequence. In one example, in block 1110, determine a system state transition using real-time monitoring of a plurality of IO rings. In one example, the real-time monitoring uses a ring depth defined by a producer index and a consumer index. In one example, the ring depth is a difference between the producer index and the consumer index. In one example, the system state may be a power savings mode, a performance mode or a normal mode.

In one example, if the ring depth is less than a minimum ring depth threshold over a configurable monitoring interval, then transition to a power savings mode. In one example, if the ring depth is greater than a maximum ring depth threshold over a configurable monitoring interval, then transition to a performance mode. In one example, if the ring depth is zero over a configurable monitoring interval, then transition to a ring empty mode.

In one example, if the system state is the power savings mode, proceed to block 1115. In one example, if the system state is the performance mode, proceed to block 1120. If the system state is the normal mode, proceed to block 1125. In one example, in block 1125, remain in the normal mode. In one example, the normal mode is when the IO ring is not below the minimum ring depth threshold and is not above the maximum ring depth threshold. That is, the normal mode is active when the IO ring is not near empty and is not near full.

In one example, in block 1115, enter a power savings mode execution sequence for all processing engines. In one example, in block 1130, decrease a quantity of processing engines which are in an active power state to handle data packet traffic by transitioning a subset of processing engines to an offline state. In one example, in block 1135, determine if a software-based data plane is required. In one example, if a software-based data plane is required, proceed to block 1140; otherwise, proceed to block 1145.

In one example, in block 1140, transition a data path hardware mode and packet data flows to a dataplane stack (DS) data plane and proceed to block 1150. In one example, in block 1145, transition the data path hardware mode and packet data flows to a data plane development kit (DPDK) data plane and proceed to block 1150.

In one example, in block 1150, scale down a processing engine clock frequency. In one example, in block 1155, decrease a polling frequency of IO rings. In one example, in block 1160, introduce sleep cycles. In one example, in block 1165, generate an interrupt event wakeup signal from the processing engine hardware. In one example, in block 1170, execute a physical interface shutdown.

In one example, in block 1120, enter a performance mode execution sequence by transitioning all processing engines to performance mode and to an active power state. In one example, in block 1175, determine if a software-based data plane is required. In one example, if a software-based data plane is required, proceed to block 1180; otherwise, proceed to block 1185.

In one example, in block 1180, transition a data path hardware mode and packet data flows to a dataplane stack (DS) data plane and proceed to block 1190. In one example, in block 1185, transition the data path hardware mode and packet data flows to a data plane development kit (DPDK) data plane and proceed to block 1190.

In one example, in block 1190, scale up a processing engine clock frequency. In one example, in block 1195, increase a polling frequency of IO rings.

Figure 12:
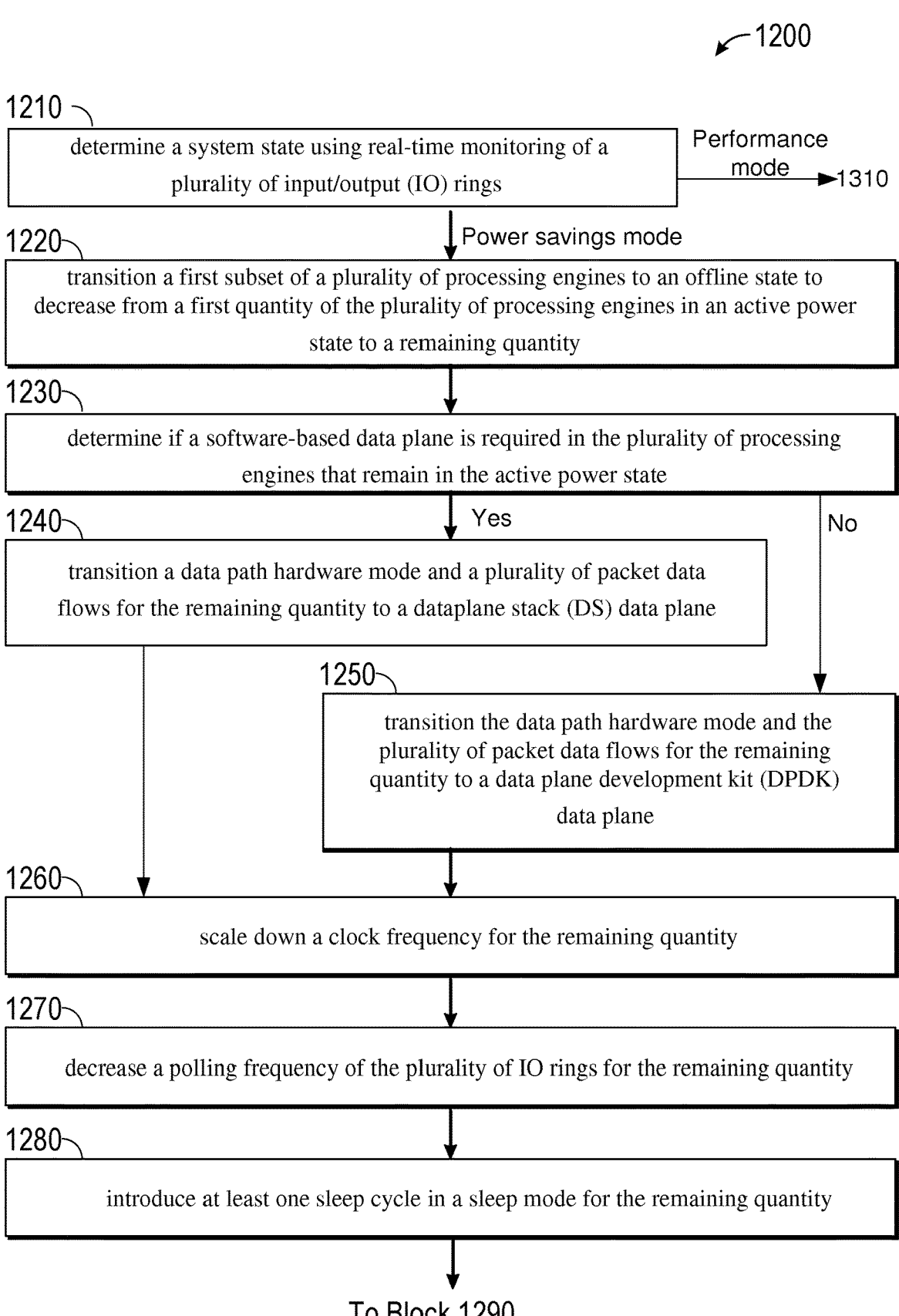
FIG. 12 illustrates an example flow diagram for implementing dynamic power management of user space data plane applications.

FIG. 12 illustrates an example flow diagram 1200 for implementing dynamic power management of user space data plane applications. In block 1210, determine a system state using real-time monitoring of a plurality of input/output (IO) rings. In one example, a system state is determined using real-time monitoring of a plurality of input/output (IO) rings. In one example, the plurality of IO rings may be a plurality of gigabit media access controller (GMAC) rings or a plurality of WiFi rings. In one example, the real-time monitoring uses a ring depth defined by a producer index and a consumer index. In one example, the producer index provides a count of produced data packets. In one example, the consumer index provides a count of consumed data packets. In one example, the determination (step in block 1210) is performed by a networking interface card (NIC), a processor, a processing engine, a microcontroller or a microprocessor, etc.

In one example, the ring depth is a difference between the producer index and the consumer index. In one example, the system state may be a power savings mode, a performance mode or a normal mode. In one example, if the ring depth is less than a minimum ring depth threshold over a configurable monitoring interval, then transition to a power savings mode. In one example, if the ring depth is greater than a maximum ring depth threshold over a configurable monitoring interval, then transition the system state to a performance mode. In one example, if the ring depth is zero over a configurable monitoring interval, then transition the system state to a ring empty mode. In one example, if the system state is transitioned to the power savings mode, proceed to block 1220. If the system state is transitioned to the performance mode, proceed to block 1310. If the system state transition is to the normal mode, remain in the normal mode.

In block 1220, transition a first subset of a plurality of processing engines to an offline state to decrease from a first quantity of the plurality of processing engines in an active power state to a remaining quantity. In one example, a first subset of a plurality of processing engines is transitioned to an offline state to decrease from a first quantity of the plurality of processing engines in an active power state to a remaining quantity. In one example, the active power state enables data packet traffic handling. In one example, the transition (step in block 1220) is performed by a flow manager hosted on a processing engine. In another example, the transition is performed by a processor, a processing engine, a microcontroller or a microprocessor, etc.

In block 1230, determine if a software-based data plane is required in the plurality of processing engines that remain in the active power state. In one example, a software-based data plane is determined if it is required in the plurality of processing engines that remain in the active power state. In one example, if a software-based data plane is required, proceed to block 1240; otherwise, proceed to step 1250. In one example, the determination (step in block 1230) is performed by a flow manager hosted on a processing engine. In another example, the determination (step in block 1230) is performed by a processor, a processing engine, a microcontroller or a microprocessor, etc.

In block 1240, transition a data path hardware mode and a plurality of packet data flows for the remaining quantity to a dataplane stack (DS) data plane and proceed to block 1260. In one example, a data path hardware mode and a plurality of packet data flows for the remaining quantity are transitioned to a dataplane stack (DS) data plane. In one example, the transition (step in block 1240) is performed by a flow manager hosted on a processing engine. In another example, the transition (step in block 1240) is performed by a processor, a processing engine, a microcontroller or a microprocessor, etc.

In block 1250, transition the data path hardware mode and the plurality of packet data flows for the remaining quantity to a data plane development kit (DPDK) data plane and proceed to block 1260. In one example, the data path hardware mode and the plurality of packet data flows for the remaining quantity are transitioned to a data plane development kit (DPDK) data plane. In one example, the transition (step in block 1250) is performed by a flow manager hosted on a processing engine. In another example, the transition (step in block 1250) is performed by a processor, a processing engine, a microcontroller or a microprocessor, etc.

In block 1260, scale down a clock frequency for the remaining quantity. In one example, a clock frequency for the remaining quantity is scaled down. In one example, the scaled down processing engine clock frequency improves dc power efficiency with a decrease in performance. In one example, the scaling down (step in block 1260) is performed by a system controller or by a CPU (e.g., CPU 120).

In block 1270, decrease a polling frequency of the plurality of IO rings for the remaining quantity. In one example, a polling frequency of the plurality of IO rings for the remaining quantity is decreased. In one example, the polling frequency is an interrogation periodicity of a polling management device (PMD). In one example, the scaled down polling frequency improves dc power efficiency with a decrease in performance. In one example, the decreasing (step in block 1270) is performed by a system controller or by a CPU (e.g., CPU 120).

In block 1280, introduce at least one sleep cycle in a sleep mode for the remaining quantity. In one example at least one sleep cycle in a sleep mode for the remaining quantity is introduced. In example, the term introduce means to insert. In one example, the PMD may use a hardware-based sleep instruction to configure a sleep mode by introducing sleep cycles for a configurable sleep period. In one example, the sleep mode results in a reduced dc power consumption. In one example, the introducing (step in block 1280) is performed by a system controller or by a CPU (e.g., CPU 120).

In block 1290, generate a wakeup interrupt signal, upon arrival of a data packet in a network interface, for at least one processing engine hardware from the remaining quantity. In one example, a wakeup interrupt signal, upon arrival of a data packet in a network interface, for at least one processing engine hardware from the remaining quantity is generated. In one example, when the data packet arrives in the network interface, a power savings application may relaunch a data plane development kit (DPDK) data path and DPDK-based fast path application. In one example, the network interface is implemented with a network interface card (NIC). In one example, the processing engine hardware is a platform or a host for a processing engine. In one example, the generation (step in block 1290) is performed by a networking interface card (NIC), a processor, a processing engine, a microcontroller or a microprocessor, etc.

In block 1300, execute a physical interface shutdown for the remaining quantity. In one example, a physical interface shutdown for the remaining quantity is executed. In one example, the physical interface shutdown may be triggered by a ring empty interrupt signal.

In block 1310, transition a second subset of the plurality of processing engines to an active state to increase to a second quantity of the plurality of processing engines in the active power state. In one example, a second subset of the plurality of processing engines is transitioned to an active state to increase to a second quantity of the plurality of processing engines in the active power state. In one example, the active power state enables data packet traffic handling. In one example, the transition (step in block 1310) is performed by a flow manager hosted on a processing engine. In another example, the transition (step in block 1310) is performed by a processor, a processing engine, a microcontroller or a microprocessor, etc.

In block 1320, determine if the software-based data plane is required for the second quantity. In one example, the software-based data plane is determined if it is required for the second quantity. In one example, if a software-based data plane is required, proceed to block 1330; otherwise, proceed to step 1340. In one example, the determination (step in block 1320) is performed by a flow manager hosted on a processing engine. In another example, the determination (step in block 1320) is performed by a processor, a processing engine, a microcontroller or a microprocessor, etc.

In block 1330, transition the data path hardware mode and the plurality of packet data flows to a dataplane stack (DS) data plane for the second quantity and proceed to block 1350. In one example, the data path hardware mode and the plurality of packet data flows are transitioned to a dataplane stack (DS) data plane for the second quantity. In one example, the transition (step in block 1330) is performed by a flow manager hosted on a processing engine. In another example, the transition (step in block 1330) is performed by a processor, a processing engine, a microcontroller or a microprocessor, etc.

In block 1340, transition the data path hardware mode and the plurality of packet data flows to the data plane development kit (DPDK) data plane for the second quantity and proceed to block 1350. In one example, the data path hardware mode and the plurality of packet data flows are transitioned to the data plane development kit (DPDK) data plane for the second quantity. In one example, the transition (step in block 1340) is performed by a flow manager hosted on a processing engine. In another example, the transition (step in block 1340) is performed by a processor, a processing engine, a microcontroller or a microprocessor, etc.

In block 1350, scale up a clock frequency for the second quantity. In one example, a clock frequency for the second quantity is scaled up. In one example, the scaled up processing engine clock frequency decreases dc power efficiency with an increase in performance. In one example, the scaling up (step in block 1350) is performed by a system controller or by a CPU (e.g., CPU 120).

In block 1360, increase the polling frequency of the plurality of IO rings for the second quantity. In one example, the polling frequency of the plurality of IO rings for the second quantity is increased. In one example, the polling frequency is an interrogation periodicity of a polling management device (PMD). In one example, the increased polling frequency decreases dc power efficiency with an increase in performance. In one example, the increasing (step in block 1360) is performed by a system controller or by a CPU (e.g., CPU 120).

In one aspect, one or more of the steps for providing dynamic power management in FIGS. 11 and 12 may be executed by one or more processors which may include hardware, software, firmware, etc. The one or more processors, for example, may be used to execute software or firmware needed to perform the steps in the flow diagrams of FIGS. 11 and 12. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. A method comprising
determining a system state using real-time monitoring of a plurality of input/output (IO) rings;
transitioning a subset of a plurality of processing engines to an offline state to decrease from a quantity of the plurality of processing engines in an active power state to a remaining quantity;
determining if a software-based data plane is required in the plurality of processing engines that remain in the active power state;
in response to determining if a software-based data plane is required in the plurality of processing engines that remain in the active power state, transitioning a data path hardware mode and a plurality of packet data flows for the remaining quantity.

2. The method of claim 1, wherein the real-time monitoring uses a ring depth defined by a producer index and a consumer index.

3. The method of claim 2, wherein the producer index provides a count of produced data packets.

4. The method of claim 2, wherein the consumer index provides a count of consumed data packets.

5. The method of claim 2, wherein the ring depth is a difference between the producer index and the consumer index.

6. The method of claim 1, wherein the system state includes one of the following: a power savings mode, a performance mode or a normal mode.

7. The method of claim 6, further comprising scaling down a clock frequency for the remaining quantity.

8. The method of claim 7, further comprising decreasing a polling frequency of the plurality of IO rings for the remaining quantity.

9. The method of claim 8, further comprising introducing at least one sleep cycle in a sleep mode for the remaining quantity.

10. The method of claim 9, further comprising generating a wakeup interrupt signal, upon arrival of a data packet in a network interface, for at least one processing engine hardware from the remaining quantity.

11. The method of claim 10, further comprising executing a physical interface shutdown for the remaining quantity.

12. The method of claim 1, wherein the data path hardware mode and the plurality of packet data flows are transitioned to a dataplane stack (DS) data plane for the remaining quantity.

13. The method of claim 1, wherein the data path hardware mode and the plurality of packet data flows are transitioned to a data plane development kit (DPDK) data plane for the remaining quantity.

14. A method comprising:
determining a system state using real-time monitoring of a plurality of input/output (IO) rings;
transitioning a subset of a plurality of processing engines to an active state to increase to a quantity of the plurality of processing engines in the active power state;
determining if a software-based data plane is required in the second quantity;
in response to determining if a software-based data plane is required in the second quantity;
transitioning a data path hardware mode and a plurality of packet data flows for the quantity.

15. The method of claim 14, further comprising determining if the software-based data plane is required for the quantity.

16. The method of claim 15, further comprising scaling up a clock frequency for the quantity.

17. The method of claim 16, further comprising increasing the polling frequency of the plurality of IO rings for the quantity.

18. An apparatus comprising:

a network interface card (NIC) configured to determine a system state using real-time monitoring of a plurality of input/output (IO) rings;

a flow manager coupled to the NIC, the flow manager configured to transition a subset of a plurality of processing engines to an offline state to decrease from a quantity of the plurality of processing engines in an active power state to a remaining quantity;

a central processing unit (CPU) coupled to the NIC, the CPU configured to scale down a clock frequency for the remaining quantity of the plurality of processing engines;

wherein the flow manager is configured to decrease a polling frequency of the plurality of IO rings for the remaining quantity.

19. The apparatus of claim 18, wherein the NIC is further configured to determine the system state using the real-time monitoring by using a ring depth defined by a difference between a producer index and a consumer index.

20. The apparatus of claim 19, wherein the system state includes one of the following: a power savings mode, a performance mode or a normal mode.

\*    \*    \*    \*    \*